Dec. 2, 1947.  A. DE PALMA ET AL  2,431,791
GRAVITY CONVEYING CHUTE AND CONTROLLING MECHANISM
Filed Feb. 15, 1946  2 Sheets-Sheet 1
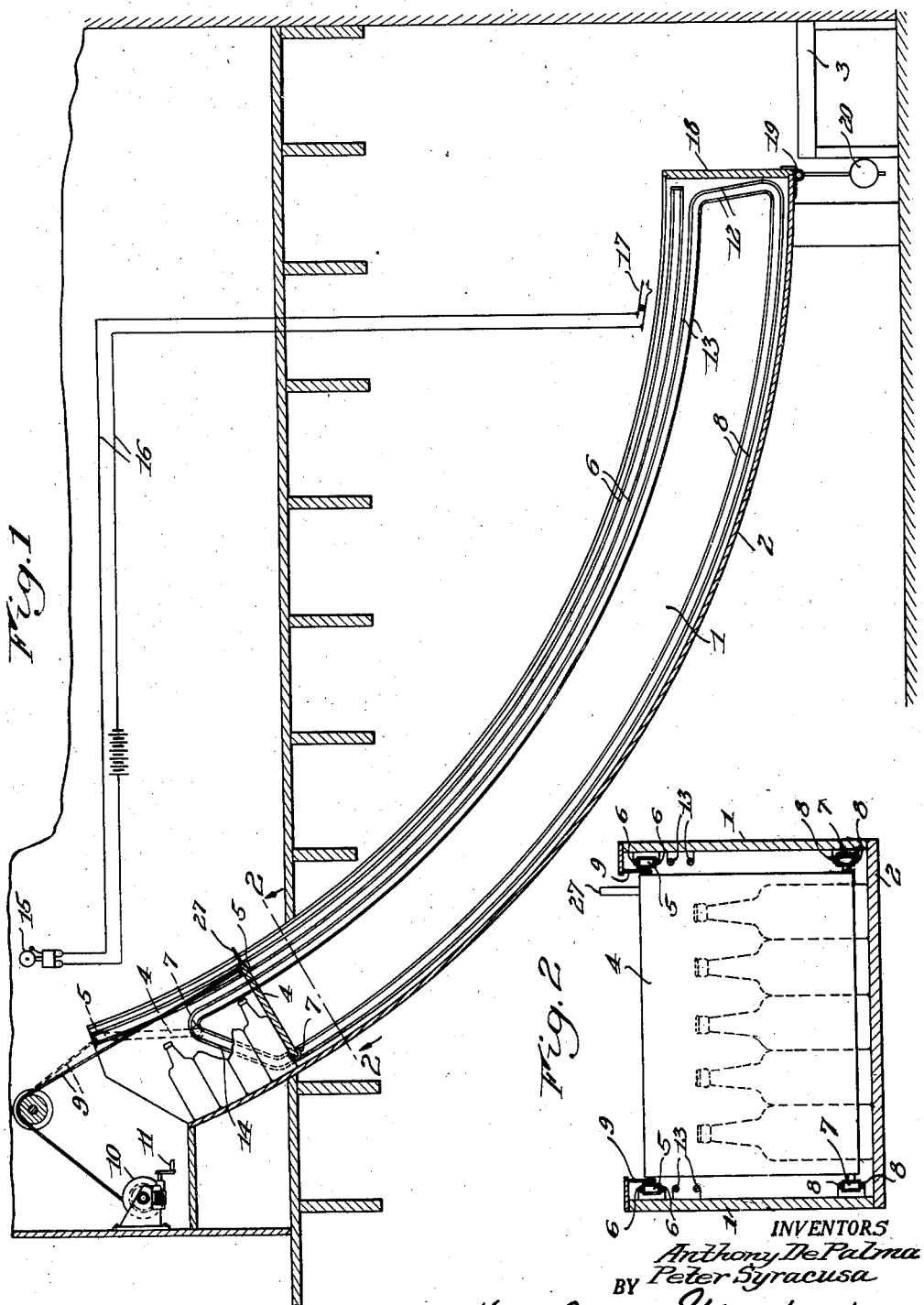
INVENTORS
Anthony DePalma
Peter Syracusa
BY Harold E. Stonebraker,
their Attorney

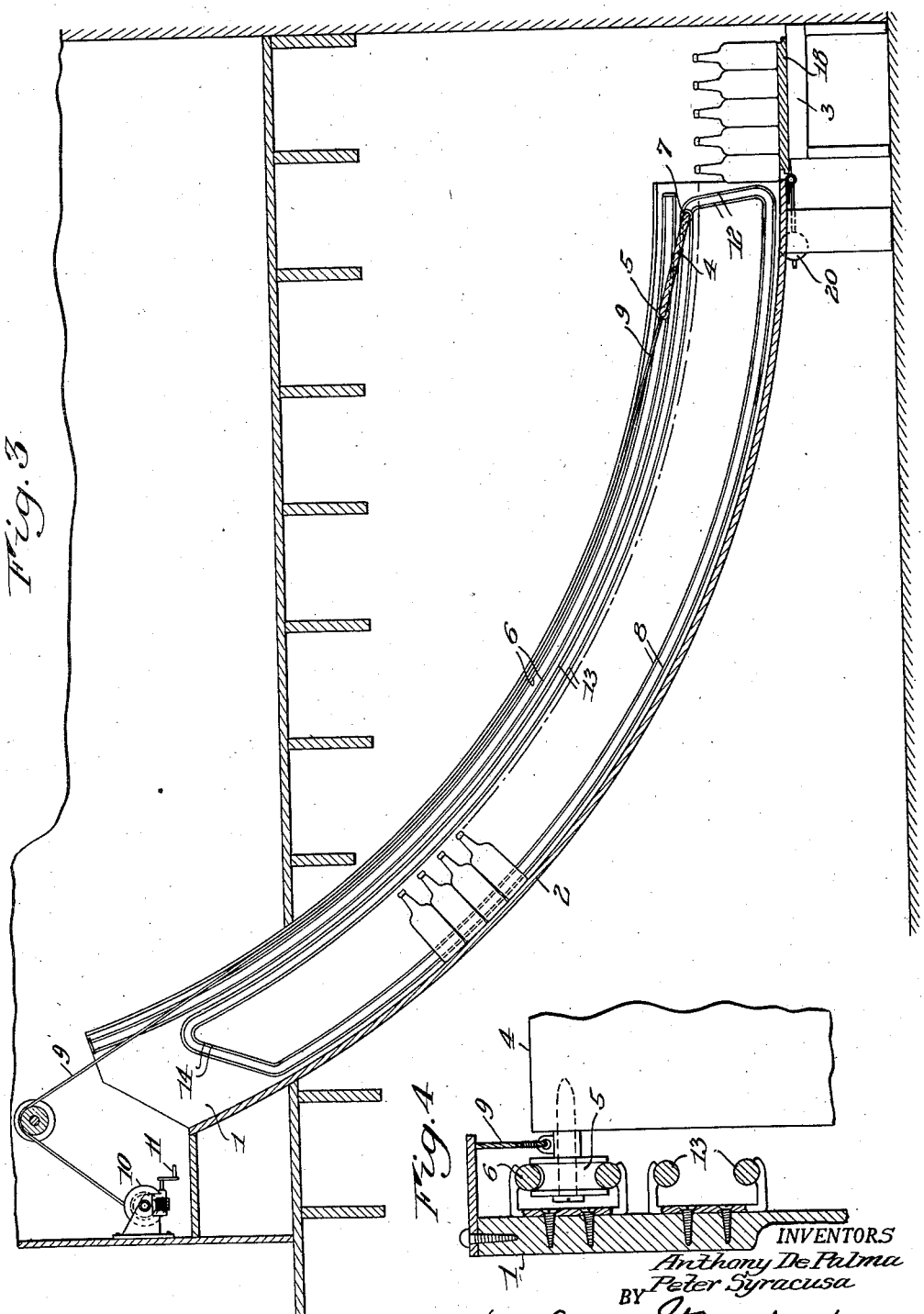

Patented Dec. 2, 1947

2,431,791

UNITED STATES PATENT OFFICE 2,431,791

GRAVITY CONVEYING CHUTE AND CONTROLLING MECHANISM

Anthony De Palma, Greece, and Peter Syracusa, Rochester, N. Y.

Application February 15, 1946, Serial No. 647,688

2 Claims. (Cl. 193—32)

This invention relates to a gravity conveying chute and controlling mechanism, and has for its purpose to afford a structure for conveying bottles from one level to a lower level in a manner that requires minimum effort and attention and which protects the bottles effectively against breakage.

More particularly, the invention is designed to convey bottles from the main floor of a grocery store to the basement, so that a cashier or clerk can quickly and readily dispose of empty bottles as they are returned, by placing them in a chute in which they are conveyed by gravity to the basement, where they can be removed at convenient times when a sufficient quantity has collected.

Another object of the invention is to afford a structure including a chute in which bottles of any size may be positioned and maintained in upright position while moving downwardly along the chute, the bottles being held by a barrier in advance thereof until the space at the upper end of the chute adjacent the operator is filled, whereupon the operator releases the barrier and permits it to move downwardly by gravity with the weight of the bottles behind it for a sufficient distance to permit the reception of additional bottles in the chute behind the barrier, after which the barrier is again held stationary.

A further purpose of the invention is to afford a structure such that a chute extending from a main floor to a basement may be completely filled with bottles arranged in upright position and held by a barrier in advance thereof, thus permitting the operator to insert bottles at the top of the chute until the barrier has moved to its extreme lowermost position, from which the barrier can be removed and repositioned at the top of the chute.

An additional object of the invention is to afford a gravity conveyor employing an adjustable barrier positioned in advance of a mass of bottles, with controlling mechanism arranged so that the operator may always determine the position of the barrier from her location at the top of the chute and by a quick, simple manipulation may release the barrier for any desired extent of movement endwise of the chute to permit the bottles behind the barrier to move a corresponding distance and release space for the insertion of additional bottles, the barrier being maintained automatically in any position by the controlling mechanism.

Still another purpose of the invention is to afford a structure whereby when the barrier reaches the limit of its downward travel along the chute, the operator may by means of controlling mechanism at the top of the chute return the barrier to starting position through the instrumentality of means which automatically lifts the barrier out of the chute and guides its upward travel when the operator initiates its return movement.

A further object of the invention is to provide simple, practical means for limiting movement of the bottles after the barrier has been removed for return to initial position, whereby the bottles at the bottom of the chute can be removed as desired, and those remaining within the chute will continuously follow down by gravity and be held against a suitable gate at the lower end.

To these and other ends, the invention consists in the construction and arrangement of parts that will appear clearly from the following description when read in conjunction with the accompanying drawings, the novel features being pointed out in the claims following the specification.

In the drawings:

Fig. 1 is a longitudinal vertical sectional view taken centrally of the chute showing the barrier near its initial position at the top of the chute with a few bottles retained by the barrier, the position of the barrier during return movement being illustrated in dotted lines;

Fig. 2 is a transverse sectional view on line 2—2 of Fig. 1;

Fig. 3 is a view similar to Fig. 1, showing the barrier at the lower end of the chute about to be returned, and the bottles remaining in the chute indicated by dot and dash line, and Fig. 4 is an enlarged sectional view of the upper tracks which support the barrier.

Referring more particularly to the drawings in which like reference numerals refer to the same parts throughout the several views, one practical and illustrative embodiment of the invention includes a chute provided with side walls 1 and a bottom wall 2, which latter follows a continuous gradual curve from one level to a lower level, as for instance from the main floor of a grocery store to the basement, and terminates at its lower end in a substantially horizontal portion that may be supported on a suitable unloading table or base 3. The curvature of the bottom of the chute is such that when bottles are positioned vertically behind the barrier, to be described presently, and permitted to move downwardly when the barrier is released, the bottles remain upright and are in upright position when they reach the bottom of the chute. The bottles are thus protected against breakage because the neck portions, which are the weakest parts, are free from contact with the bodies or neck portions of other bottles, and are finally positioned at the bottom of the chute for quick, easy removal, and without excessive pressure from the weight of the bottles behind those being removed.

Located within the chute is a barrier 4 which holds the bottles against movement, and is positioned perpendicularly of the bottom of the chute. The barrier 4 is normally held fixed, and when released is free to move endwise of the chute due to the weight of the bottles behind it. The barrier is held in any position between the ends of the chute by controlling mechanism that is operable to release the barrier and also to return the barrier from the limit of its movement at the bottom of the chute to starting position at the top of the chute, when the chute has been completely filled with bottles.

To accomplish this, the barrier 4 is provided with rollers 5 at opposite points adjacent its upper edge, and these are held and travel between the stationary tracks 6, while 7 designate rollers secured at opposite points of the barrier adjacent its bottom edge, and which are supported and travel between the stationary tracks 8, the tracks 6 and 8 being suitably attached to the side walls 1 of the chute in spaced relation to the vertical side edges of the barrier 4.

The barrier is operated by suitable controlling mechanism at the top of the chute, and to this end the barrier is connected by means of cables or other connections 9 with a windlass or winding mechanism 10 located at the top of the chute for winding cables 9 and returning the barrier to its uppermost or starting position. The windlass 10 is operated through a worm and worm gear from a handle 11, which is turned in one direction to release the cables 9 and in the opposite direction to wind the cables 9, and the worm and worm gear act to hold the cables 9 and barrier 4 in any position. The operator permits downward movement of the barrier and the bottles ward behind it by turning the handle 11 in one direction and permitting sufficient unwinding of the cables 9 to afford space for additional bottles at the top of the chute, whereupon by releasing handle 11, the cables and barrier are held in such position until the space at the top of the chute has been filled with bottles. This operation is repeated until the barrier reaches the bottom of the chute and the limit of its downward travel, at which point the chute is filled with bottles extending to the top of the chute and all arranged in upright position.

It will be understood that windlass 10 is unwound to permit the periodic downward movements of the barrier and bottles retained thereby, and is wound to return the barrier to starting position after it reaches the limit of its downward travel. It is necessary to provide means for lifting the barrier out of the chute so that it will clear the bottles in the chute during its return movement. To accomplish this, the lower tracks 8 are provided with upwardly extending portions 12 at the lower end of the chute, return portions 13 extending above the chute parallel to the lower portions 8, and downwardly extending portions 14 at the upper end of the chute connecting the lower portions 8 and the upper portions 13. The rollers 7 at the bottom of the barrier thus engage tracks which extend entirely around the chute from top to bottom thereof and cause the barrier to be elevated out of contact with the bottles in the chute while being returned to starting position. When the barrier reaches the limit of its downward travel, it is in a vertical position with its lower rollers 7 directly under the vertically extending tracks 12, and when windlass 10 is then operated to exert a pull on the upper end of the barrier, the latter is drawn backwardly and upwardly along tracks 6 and at the same time the lower portion of the barrier moves upwardly along the vertical tracks 12 which are curved rearwardly at their upper ends in order readily to guide the rollers 7 on to the return tracks 13. The barrier is thus returned to its starting point in the inclined position illustrated in Fig. 3 with its lower rollers engaging tracks 13 above the bottles in the chute and its upper rollers riding on tracks 6. The tracks 6 extend at the upper portion of the chute beyond the vertical tracks 14, so as to permit the upper portion of the barrier with the rollers 5 to move far enough upwardly to permit the lower portion of the barrier with the rollers 7 to move downwardly along the vertical tracks 14, and the barrier upon being released by the operator sufficiently for this purpose, drops downwardly by gravity along tracks 14 until its lower portion again engages the tracks 8, its upper portion at the same time moving downwardly along tracks 6 until the barrier is at starting position and substantially perpendicular to the chute. The operator then releases the windlass handle 11 and the barrier is maintained in this position until a sufficient number of bottles are filled in behind it to require downward movement. At such time, the windlass is again unwound and the weight of the bottles moves the barrier downwardly as far as desired whereupon the operation already described is repeated.

It is desirable to give a signal slightly in advance of when the barrier has reached the limit of its downward movement to advise the operator to effect return of the barrier, and to accomplish this, a suitable signal 15 is controlled by a circuit 16, which includes a normally open switch 17 that is arranged to be operated by an arm 27 on the barrier 4 when the latter approaches the end of its downward movement and travels past the switch. The operator is thus notified before the chute is full of bottles and the barrier has reached the limit of its downward travel, whereupon the windlass is first released to permit the barrier to travel to its limit of movement and then wound to return the barrier to starting position as previously described.

When the barrier is removed from the path of the bottles to return it to starting position, it is desirable to provide a means for holding the bottles on the chute until they are removed manually, to be placed in cases, boxes, or otherwise disposed of, and this is satisfactorily accomplished by a movable gate 18 which is preferably pivoted at 19 on a stationary support and provided with a counterweight 20, acting to hold the gate 18 normally in upright position and to permit its yielding to a horizontal position as the weight of the bottles presses against it. It will be understood that the bottles are removed from the bottom of the chute as they come in contact with the barrier 4, or with the yieldable gate 18 after the barrier has been elevated for return to the upper end of the chute.

The structure will handle any articles of a size to fit within the chute, and is particularly designed to accommodate beer and soft drink bottles of various sizes and to permit their being positioned in the chute in upright position one against the other and retaining such upright position during their movement downwardly of the chute until they are ready for removal. In this way, only the body portions of the bottles are in contact, the neck portions are separated and protected against contact and breakage, thus overcoming the most serious objection heretofore to the handling of empty bottles due to the large breakage resulting from the neck of a bottle striking the neck of another bottle or some other hard surface or object. Thus empty bottles can be disposed of immediately and with a minimum of effort on the part of the clerk whose duty it is to remove them. The bottles can be positioned in the chute and permitted to move downwardly by gravity as often as required, and need not be removed from the bottom of the chute until the latter is entirely filled between the two levels. The chute thus constitutes a continuous receptacle for the bottles which have to be removed from the chute in the basement only once or twice a day, depending upon the capacity of the chute and the number of bottles that must be handled.

While the invention has been described with reference to the structural embodiment shown, it is not confined to the particular arrangement disclosed, and this application is intended to cover such modifications or departures as may come within the purposes of the improvement or the scope of the following claims.

We claim:

1. Gravity conveying mechanism including a chute having a gradually and continuously curved bottom extending from one level to a lower level and terminating at its lower end in a generally horizontal portion, a barrier positioned crosswise of the chute in the path of advancing articles, supporting and guiding tracks on which the top of the barrier travels, supporting and guiding tracks on which the bottom of the barrier travels, said latter tracks extending around the chute endwise and acting to elevate the bottom of the barrier when it reaches the lower end of the chute and is about to be pulled back to starting position, winding means at the top of the chute, and a connection from the barrier to said winding means.

2. Gravity conveying mechanism including a chute having an inclined bottom extending from one level to a lower level, a barrier positioned crosswise of the chute in the path of advancing articles, supporting and guiding tracks on which the top of the barrier travels, supporting and guiding tracks on which the bottom of the barrier travels, said latter tracks extending around the chute endwise and acting to elevate the bottom of the barrier when it reaches the lower end of the chute and is about to be pulled back to starting position, winding means at the top of the chute, and a connection from the barrier to said winding means.

ANTHONY DE PALMA.
PETER SYRACUSA.

REFERENCES CITED

The following references are of record in the file of this patent:

UNITED STATES PATENTS

| Number | Name | Date |
|---|---|---|
| 2,296,444 | Kohl et al. | Sept. 22, 1942 |

FOREIGN PATENTS

| Number | Country | Date |
|---|---|---|
| 796,923 | France | Feb. 3, 1936 |